Aug. 28, 1923.

A. P. BRUSH 1,466,445

LUBRICATING SYSTEM

Filed May 27, 1920

Inventor
Alanson P. Brush

By Whittemore Hulbert & Whittemore

Attorneys

Patented Aug. 28, 1923.

1,466,445

UNITED STATES PATENT OFFICE.

ALANSON P. BRUSH, OF DETROIT, MICHIGAN.

LUBRICATING SYSTEM.

Application filed May 27, 1920. Serial No. 384,539.

*To all whom it may concern:*

Be it known that I, ALANSON P. BRUSH, a citizen of the United States of America, residing at Detroit, in the county of Wayne and State of Michigan, have invented certain new and useful Improvements in Lubricating Systems, of which the following is a specification, reference being had therein to the accompanying drawings.

The invention relates to lubricating systems for internal combustion engines and has more particular reference to the so-called pressure systems, in which the lubricant is fed under pressure to the several bearings and cylinders to be lubricated. With such systems the lubricant is generally propelled by a pump running in timed relation to the engine, and therefore the displacement of the pump and the pressure developed upon the system is proportional to the engine speed, with the consequence that more lubricant is supplied at high speeds than at low speeds. The defect of such systems is that frequently the engine may be operating under heavy loads at low speeds or running with light loads at high speeds, as, for example, when the engine is used to propel a vehicle which is coasting, this results in a lack of lubrication in the one case and over-lubrication in the other case, both of which are detrimental.

It is the object of the present invention to provide means for automatically regulating the pressure on the lubricant substantially in proportion to power output. This I have accomplished by variations of velocity in a gaseous stream coincident with variations in the power output for correspondingly varying the pressure upon the system. More specifically, the pressure upon the lubricant is regulated by means controlled by the velocity of the gas in the carburetor or in the exhaust, as hereinafter set forth.

Figure 1:
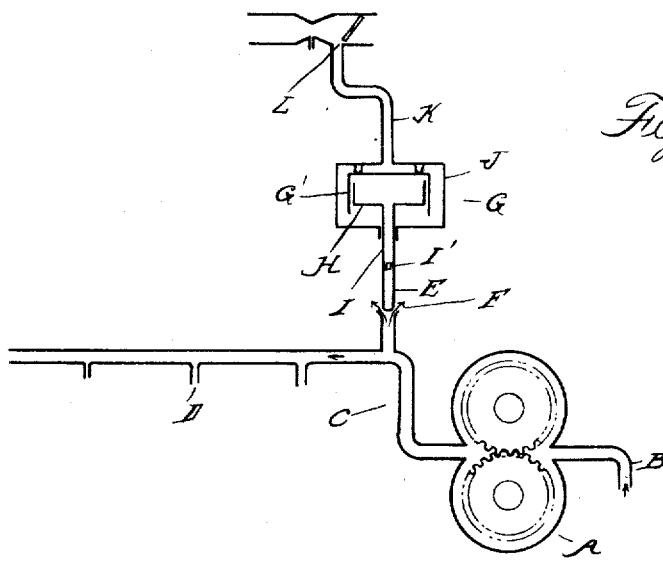
Figure 1 is a diagrammatic view of my lubricating system as operated by velocity of the gas in the carburetor.

The lubricating system to which my invention is applied may be of any of the well-known types, excepting as hereinafter set forth, but as shown in Figure 1, I have indicated merely the feeding of the lubricant under pressure to a plurality of discharge outlets. As thus shown, A is the pump, B is the lubricant supply conduit therefor, and C the outlet for pressure conduit which leads to a plurality of discharge outlets D for the bearings, cylinders or other parts to be lubricated. The displacement of the pump is more than sufficient to supply the bearings and cylinders at all running speeds and loads and the surplus lubricant is discharged through a relief port.

It is customary to provide such systems with spring closed relief valves, which open when the pressure becomes high enough to overcome the spring tension, permitting the return of a portion of the lubricant to the supply reservoir. The tension of the spring determines the minimum pressure or the pressure at which the valve opens, but inasmuch as the displacement of the pump is proportional to the engine speed, the higher such speed the greater will be the lubricant pressure. Thus if the tension of the spring is high, there will be too great a pressure, and consequently, an over-supply of lubricant when the engine is operating with low power output; and on the other hand, if the tension of the spring is low, there may be failure of proper lubrication when the engine is operating to produce high power output.

In place of the spring closed relief valve operating under constant tension, I have substituted a variable obstruction to the relief comprising the plunger E controlling a by-pass port F arranged at any suitable point in the system. The plunger E is operated by means of a pneumatic motor G, which, as shown, consists of a cylinder G' containing a piston H connected by a hollow stem or rod I to the plunger. Surrounding the cylinder G' is the casing J, which is connected with the conduit K extending to the intake carburetor and connecting therewith at a point where the velocity of the gaseous stream is substantially proportional to power output. This will communicate to the casing J the suction or atmospheric depression existing in the carburetor and which determines the quantity of fuel fed and the pressure in said casing J will be communicated to one side of the piston H in the cylinder G'. The opposite side of the piston is, however, exposed to the pressure within the cylinder, which is vented to the atmosphere, as by the port I' in the hollow rod I.

With the construction as described when the engine is running with low power output, the pressure within the carburetor at the point L is but very slightly depressed from atmospheric pressure, so that the piston H is exposed to substantially equal pressures on both sides. This will permit the pressure of the lubricant within the conduit C to force outward the plunger E, thereby allowing the escape of lubricant through the port F so that the pressure on the system will be relatively low. When the power output is increased, the higher vacuum within the carburetor will be communicated through the conduit K to the casing J and the pressure on the outer side of the piston will be reduced, while the pressure on the inner side thereof will remain the same. Thus, the differential pressure will operate on the plunger E to increase the obstruction to the escape of lubricant, so that the pressure on the system will be increased.

Figure 2:
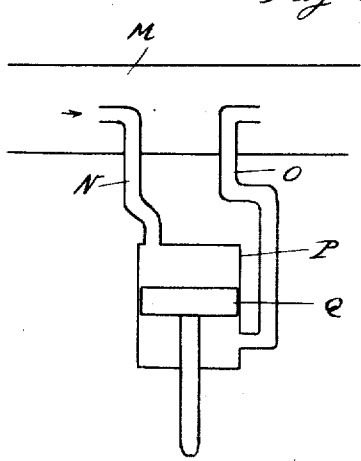
Figure 2 is a similar view showing the system operated by variations in velocity in the exhaust.

In Figure 2 I have shown a modified construction in which M is the exhaust conduit for the engine and N and O are conduits extending into said exhaust conduit and facing oppositely. The conduit N communicates with a cylinder P on one side of the piston Q therein, while the conduit O communicates with said cylinder on the opposite side of the piston. Thus variations in velocity of the exhaust gases passing through the conduit M will change the differential pressure operating upon the piston Q, which latter will variably obstruct the relief port in the lubricating system. It is obvious that this modification will produce substantially the same effect, viz, the variation in pressure upon the lubricating system substantially proportional to the power output.

What I claim as my invention is:

1. In an engine lubricating system, the combination with means for feeding lubricant under pressure, of means operated by variations in pressure in the engine intake on the atmospheric side of the throttle for varying the pressure upon the lubricant substantially proportional to power output.

2. In an engine lubricating system, the combination with means for feeding lubricant under pressure, of means operated by variations in pressure in the carburetor for varying pressure upon the lubricant substantially in proportion to power output.

3. In an engine lubricating system, the combination with means for feeding lubricant under pressure, of means operated by the fuel feeding means of the carburetor upon the atmospheric side of the throttle for variably relieving pressure upon the lubricant to maintain the same substantially proportional to power output.

4. In an engine lubricating system, the combination with means for feeding lubricant under pressure, of a plunger constituting a pressure relief means and actuated by opposed fluid pressures, one of said pressures varying with the velocity of a gaseous stream coincident with the variations in the power output.

5. In an engine lubricating system, the combination with means for feeding lubricant under pressure, of a pressure relief valve for varying the pressure upon the lubricant, a piston for operating said valve subjected to opposing pressures upon opposite sides thereof, one of said pressures being communicated to said piston from the engine intake on the atmospheric side thereof, whereby increase of gas velocity in said intake, increases the pressure on said relief valve substantially proportionate to the power output.

6. In an engine lubricating system, the combination with means for feeding lubricant under pressure, of a closed chamber in communication with the engine intake below the throttle, a cylinder in said chamber, a closure for one end of said cylinder, a piston in said cylinder having a stem extending through said chamber and forming a seal therewith, means for venting said cylinder to the atmosphere, and a pressure relief valve for varying the pressure upon the lubricant controlled by said piston to proportion said pressure to the power output.

7. In an engine lubricating system, the combination with means for feeding the lubricant under pressure, of pressure relief means, means operated by variations in the velocity of a gaseous stream coincident with variations in power output for variably obstructing said pressure relief means.

In testimony whereof I affix my signature.

ALANSON P. BRUSH.